Aug. 22, 1961 L. S. MIMS 2,997,587
NEUTRONIC REACTOR CORE INSTRUMENT
Filed April 10, 1958
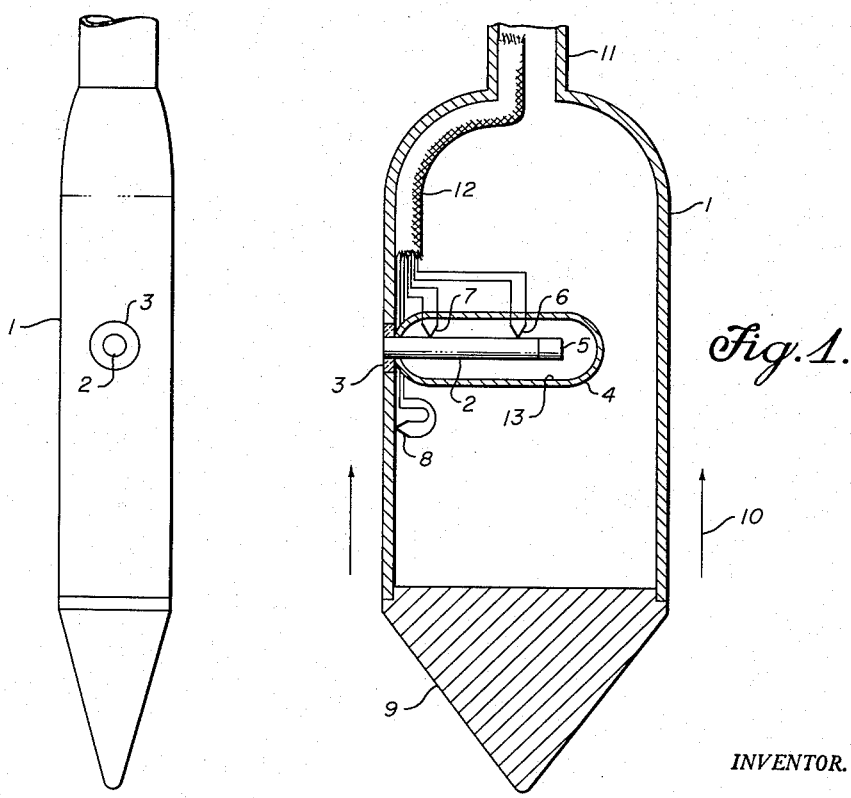
INVENTOR.
LISSO S. MIMS

United States Patent Office 2,997,587
Patented Aug. 22, 1961

2,997,587
NEUTRONIC REACTOR CORE INSTRUMENT
Lisso Stewart Mims, Tarzana, Calif., assignor, by mesne assignments, to the United States of America as represented by the United States Atomic Energy Commission
Filed Apr. 10, 1958, Ser. No. 727,753
5 Claims. (Cl. 250—83.1)

The present invention relates to a neutron responsive device and particularly to such a device which will indicate neutron flux density and coolant flow rate in a neutronic reactor core for use in connection with the control and operation of neutronic reactor systems.

A neutronic reactor system, as the term is used herein, constitutes a complete system designed for initiating and carrying out controlled nuclear chain reactions. The reactor, per se, broadly speaking is a device comprising a plurality of uranium or other fissionable elements dispersed in a neutron slowing material or moderator, such as graphite or heavy water, capable of slowing fast neuetrons to thermal energy and that is built of sufficient size to produce a self-sustaining nuclear chain reaction. Examples of reactors of the type in which the invention may be used are shown in FIGURES 31 and 37 of U.S. Patent No. 2,708,656 to Fermi et al. In many reactors a primary coolant fluid is passed through the reactor core to absorb the heat produced by the fissionable elements and then to a portion of the system where the absorbed heat is converted to useful energy, such as a heat exchanger to produce steam for driving a turbo-generator.

The power developed in a neutronic reactor system is in general related proportionally to the neutron flux density within the reactor core, such neutron flux density being maintained by liberation of new fission neutrons in the fission of the fuel material. Thus, neutron flux density provides a convenient basis for monitoring and controlling the operation of such systems and there is a need for a device that is capable of accurately and continuously indicating the neutron flux density within or adjacent to neutronic reactors. It is also desirable to measure the temperature and rate of flow of the coolant in the reactor core.

Although the measuring of conditions at a given point in the core of a reactor is of great importance to the designer and to the operator, space limitations usually prohibit the measuring of more than one entity at any given location. Furthermore, the measuring of coolant flow in the channel adjacent to the fuel element usually involves equipment which produces a pressure drop and hence perturbs the flow that is being measured. Measuring of temperature, neutron flux, and flow velocity would normally involve both electric wire and flow tubing or instrument leads. Where two types of leads are required, this causes complicated sealing problems at the reactor vessel penetration.

A principal object of the invention is to provide an instrument which is capable of measuring the neutron flux, coolant temperature, and coolant flow at a point in a reactor without perturbing the flow and without requiring the use of flow tubing as instrument leads.

It is a further object of the invention to provide a device, simple and compact in structure, which is capable of measuring both the neutron flux and coolant flow at a point in a reactor, or either one of these independently.

Another object of the invention is to provide a device which is readily insertable into and removable from the core of a neutronic reactor and is capable of measuring the conditions of neutronic flux, coolant temperature and coolant flow simultaneously, accurately and continuously during operation of the reactor.

As will hereinafter appear, the above objects are accomplished by means of thermocouples arranged in a container type member, either incorporated in or readily insertable into a reactor core and containing a heat conducting element having a heat source of fissionable material at the inner end so that temperature readings may be taken in the heat conducting material at or near the heat source, at a point remote from said source, and at a point in the container wall in contact with the coolant fluid, from which readings may be determined the thermal neutron flux, coolant temperature and coolant rate of flow. The various novel structural features, constructional arrangements contributing to the successful operation of the device of the invention, and a more complete exposition of its principles and mode of operation will be found in the following description and the accompanying drawings of certain preferred embodiments thereof.

In the drawings:

FIG. 1 is a diagrammatic, longitudinal, sectional view of a multipurpose instrument embodying the present invention;

FIG. 2 is a side elevation of the instrument of FIG. 1.

FIGS. 3 and 4 show a modified form of the invention, FIG. 4 being a sectional view on line 4—4 of FIG. 3.

The relative disposition of the parts of the instrument is shown in FIG. 1. The instrument includes a hollow container or thimble member 1, which should be made of a thin non-neutron absorbing material such as zirconium for a purpose appearing hereinafter. Protruding inwardly from the wall of the thimble is a metallic heat conducting rod 2, such as copper for example, which is attached to the thimble wall by means of a thermal insulating ring 3 and is surrounded inside the thimble by a flask 4. The end of the flask which receives the rod 2 is in sealing engagement with both the rod and thermal insulating ring for a purpose appearing below. On the inner end of the rod 2 is attached a piece of fissionable material 5, such as $U^{235}$, to function as a heat source. Temperature sensing devices, such as thermocouples designated at 6, 7 and 8, are placed at predetermined intervals along the rod 2 and on the thimble wall. Thermocouple 6 is placed adjacent the heat source 5 and thermocouple 7 is placed at a known distance from 6. The thimble may be provided with a point 9 at one end to reduce any turbulence caused by the thimble in the coolant, the coolant flow being in the direction indicated by the arrows 10. The other end of the thimble may be provided with an extension rod 11 for manipulating the device within a region of a reactor whose conditions are to be measured. Lead wires 12, extend from the thermocouples through the manipulating rod 11 to be connected to instruments which indicate, record or control in response to the signals generated in the thermocouples, as is well known in the art.

The operation of the invention will be described below. To measure the conditions within a reactor, the instrument thimble 1 is inserted into the reactor core in the region of the fuel elements and in the path of the coolant so that the coolant flows along the side walls of the thimble. When the fissionable material of the heat source 5 is exposed to neutrons in this region, energy in the form of heat is released. The heat flows from the source through the heat conducting rod 2 toward the coolant end where it is dissipated. The flask 4 is evacuated or filled with a gas having low thermal conductivity to reduce convection losses. The flask may also be coated on its interior surface 13 with a suitable coating to reduce heat loss due to radiation. These steps are taken so that virtually all the heat released at the source will be conducted out along the rod 2. This heat flow is characterized by a difference in temperature, or temperature gradient, in the rod between the heat source and the end attached to the thimble wall. By attaching thermocouple 6 to the rod 2 near the heat source 5 and thermocouple 7 near the other end, the temperature gradient between these two points can be determined. This temperature gradient t is proportional to the heat generated at the heat source, due to the neutron bombardment of the fissionable material, which heat is proportional to the neutron flux. Therefore, the temperature gradient along the rod and between points 6 and 7 is also proportional to the neutron flux in the region into which the instrument is immersed. The thermocouple at 8 measures the bulk temperature of the coolant, flowing outside the thimble. The thimble wall is preferably made of zirconium or other non-fissionable material and should be thin to minimize fast neutron and gammma heating. As will be readily apparent, there is also a temperature difference between points 7 and 8 which is due to two causes. There is a gradient between point 7 and the outer end of the rod due to the rod conducting away the heat produced in the fissionable material and there is also a temperature drop between the end of the rod and the bulk temperature of the coolant due to the conducting of the heat across the boundary film of the coolant. Since the bulk temperature of the coolant is measured by thermocouple 8 and the heat produced at 5 is measured by the temperature gradient between points 6 and 7, all quantities needed for calculating the heat transfer film coffcient of the coolant are known. Furthermore, a relationship between flow velocity, or mass flow, and film coefficient is known from correlations based on a great mass of experimental data. Such correlations show that the film coefficient varies as the mass flow raised to some known exponential power. Also, this device could be calibrated experimentally against known flows.

Another embodiment of the invention is shown in FIGS. 3 and 4 wherein the detecting device is adapted for mounting in fuel elements having the configuration of rectangular plates. Referring to FIG. 4 in particular, the container member $4^1$, preferably made of stainless steel, corresponds to the flask 4 of FIG. 1. The sides of member $4^1$ are provided with tongues 20 which fit into grooves 14 in the fuel plates 15. The thimble and stem members have been eliminated by this design. The fissionable material may be a copper-uranium alloy in rod form shown in circular cross section at $5^1$. The copper heat conductor shown at $2'$, is bonded as by silver solder, to the conductor-container interface 16 to provide a good heat transfer bond. The odd shape of the conductor $2'$ shows one particular method of minimizing the thickness of the unit; other geometries may be equally as good.

In this modification, the coolant is water which passes over the surface of the fuel plates in the direction of arrows 17. As shown in FIG. 4, the thin sections of the container serve to insulate the bulk of the container from the region where heat is transferred to the water. A ridge 18 is provided in the container in contact with the conductor to reinforce the container wall against hydrostatic pressure.

When the device is in a region of neutron flux, the fissionable material emits heat. The heat is conducted through the copper conductor $2'$ to the bonded interface 16, thence through the thickness of the container material to the water. The heat conducted upward through the ridge 18 is small compared to that conducted downward because of the low thermal conductivity of container material compared to the conductor material. The space within the container may be filled with nitrogen, by well known techniques, which will conduct only negligible heat from the conductor to the walls of the container. Thermocouple $6'$ is in a region of low temperature gradient because the heat flow is essentially to the left, as shown in FIG. 4, away from the thermocouple. Thermocouple $7'$ is in a region of low temperature gradient because of the high thermal conductivity of the conducting material and the large cross-sectional area at the point of contact. The major part of the temperature difference between points $5'$ and $7'$ is taken in the high thermal gradient region 19, where the area of the conducting material has been reduced to increase its thermal resistance. Thus relatively large thermocouple junctions can be used, and slight errors in their location will not cause excessive loss of accuracy. The bulk water temperature is measured by thermocouple $8'$. The thermocouples may be magnesium oxide insulated, chromelalumel, stainless steel sheathed and silver soldered to the various inside parts of the instrument.

A method of calculating the thermal neutron flux in a reactor and the mass flow rate of the coolant with the aid of the invention is as follows:

The mathematical expression for thermal neutron flux is:

$$\phi = \frac{C_0 A K (T_6 - T_7)}{\Sigma_f \Delta x}$$

where
$\phi$ = thermal neutron flux, neutrons/cm.$^2$–sec.
$A$ = cross sectional area of heat conducting member, ft.$^2$
$K$ = thermal conductivity of heat conducting member, B.t.u./hr.—ft.$^2$—° F./ft.
$\Sigma_f$ = macroscopic fission cross section for fissionable material for neutrons, cm.$^{-1}$
$\Delta X$ = distance between points 6 and 7 (or $6'$ and $7'$), ft.
$T_6$ = temperature at 6 (or $6'$), ° F.
$T_7$ = temperature at 7 (or $7'$), ° F.
$C_0$ = a known constant.

The mathematical expression for the mass flow rate is:

$$G = \left[ \frac{c_1 k (T_6 - T_7)}{\Delta x (T_7 - T_8)} \right]^{1.25}$$

where
$G$ = mass flow rate, lb./hr.-ft.$^2$
$K$ = thermal conductivity of heat conductor material B.t.u./ft.$^2$-hr.-° F./ft.
$\Delta X$ = temperature at 6 and 7 (or $6'$ and $7'$), ft.
$T_6$ = temperature at 6 (or $6'$), ° F.
$T_7$ = temperature at 7 (or $7'$), ° F.
$T_8$ = temperature at 8 (or $8'$), ° F.
$C_1$ = known constant.

The only unknown variables in the above equations are the temperatures. Thus, with the temperature readings given by the device of the invention the thermal neutron flux and mass flow rate of the coolant are readily determinable. As will be readily apparent to one skilled in the art, the thermocouples may be connected to suitably calibrated instruments to indicate directly the neutron flux and coolant flow in response to the signals generated by the thermocouples. Likewise, the signals produced by the thermocouples may be used to energize electrical circuits designed to control the neutron flux density by operating control rods, and the coolant flow by operating valves, for example.

The instrument of this invention can be used in any neutronic reactor which contains fluid coolant, whether the fluid be water, liquid metal, or air. Obviously it can be used to measure neutron flux only where desired without regard to the coolant flow. It works equally well in reactors using solid fuels of the pressurized water type and homogeneous fuels of the solution or slurry fuel type. No pressure drop, such as caused by Pitot tubes, or venturies are produced by the instrument. In many reactors, the velocities of the coolant are constant in any line parallel to the reactor axis and hence only one velocity reading in any particular flow path is necessary. This is especially true, of course, where the flow channel perimeter is enclosed, as in the case of plate type fuel elements. It is always more convenient to provide only one type of instrument lead seal at a reactor vessel penetration, and this instrument requires nothing but seals for electrical leads, although it supplies a variety of information.

The above described device is sufficiently compact and portable to enable it to be moved through the reactor during its operation to measure the conditions at various points.

The details of structure set forth in the drawings and described above are merely illustrative of one manner in which the invention may be utilized. It will be apparent that various other structural arrangements, not necessarily embodying the particular details disclosed herein may be constructed and accordingly the invention should not be limited thereby, but should be accorded the broadest possible coverage commensurate with the accompanying claims and the prior art.

I claim:

1. A neutron responsive instrument for measuring neutron flux, rate of coolant flow and coolant temperature within a neutronic reactor comprising a hollow housing member adapted for insertion into the coolant stream in a reactor and made from a material which is nonfissionable and has a low absorption cross-section for neutrons, a heat conducting member protruding inwardly from the inside wall of the housing member and containing an amount of neutron fissionable material at its innermost end near the center of the hollow portion of the housing member and which functions as a heat source due to the heat generated therein by nuclear fission to produce a temperature gradient along the heat conducting member, a first thermocouple having its junction in contact with the heat conducting member at a first point adjacent the fissionable material, a second thermocouple having its junction in contact with the heat conducting member at a second point near the wall of the housing member, and a third thermocouple having its junction in contact with the wall of the housing member at a point spaced from the heat conducting member where the temperature is that of the coolant medium in contact with the external side of said wall, the thermocouples being adapted to measure the temperature at said points, the temperature difference between the first and second points being proportional to and determinative of the neutron flux in the region of the instrument and the temperature difference between the second and third points being proportional to and determinative of the mass flow rate of the coolant in said region.

2. A neutron responsive instrument comprising fissionable material means which will emit heat when placed in a region of neutron flux, means for conducting the heat away from the fissionable material, means for measuring the temperature gradient in the second means between a first point near the fissionable material and a second point remote therefrom, the temperature gradient between the two points being proportional to the neutron flux in the region in which the instrument is placed, a hollow thimble member sealingly enclosing the aforesaid means, said thimble member being made of a non-fissionable heat conducting material and having the heat conducting means affixed in thermal conductive relationship to the wall thereof, a non-fissionable flask member within the hollow of the thimble sealingly enclosing the fissionable material, heat conducting means and temperature measuring means, the heat conducting means extending through the flask where it is affixed to the thimble wall, the flask being evacuated and coated on the inside to reduce any heat losses due to convection and radiation from the fissionable material and heat conducting means whereby substantially all of the heat generated in the fissionable material is conducted away through the heat conducting means, and an elongated tubular member attached to the thimble member for manipulating the instrument in the region to be examined.

3. The device of claim 2 wherein the temperature measuring means are thermocouples located at said first and second points in the heat conducting means, and an additional thermocouple temperature measuring means is provided at a point in the thimble wall which is at the same temperature as the region surrounding the instrument.

4. The device of claim 2 wherein the heat conducting means is an elongated metallic rod and the fissionable material is affixed in thermal conductive relationship thereto.

5. A neutron responsive multipurpose instrument for measuring neutron flux, rate of coolant flow and coolant temperature within the core of a neutronic reactor comprising, a hollow cylindrically shaped thimble member made of zirconium, a hollow elongated stem extending from one end of the thimble for manipulating the thimble, a point on the other end of the thimble, a copper rod bonded at one end to the thimble wall in thermal conductive relationship therewith and protruding radially inwardly, a piece of fissionable material containing $U^{235}$ bonded in thermal conductive relationship to the inner end of said rod, an evacuated flask within the thimble surrounding the rod and fissionable material in spaced relationship thereto, said flask having an opening at one end through which the rod extends, the lip of the opening sealingly engaging around the rod and inside of the thimble wall where these two members are bonded together, a first thermocouple junction attached to the rod near the fissionable material, a second thermocouple junction attached to the rod near the thimble wall, a third thermocouple junction attached to the inside of the thimble wall at a point spaced from the rod, and lead wires for the thermocouples extending through the thimble and out through the stem.

References Cited in the file of this patent
UNITED STATES PATENTS

| | | |
|---|---|---|
| 2,413,128 | Wills | Dec. 24, 1946 |
| 2,579,994 | Zinn | Dec. 25, 1951 |
| 2,677,772 | Moon | May 4, 1954 |
| 2,811,856 | Harrison | Nov. 5, 1957 |
| 2,814,731 | Werme et al. | Nov. 26, 1957 |
| 2,856,341 | Kanne | Oct. 14, 1958 |